United States Patent Office 3,508,946
Patented Apr. 28, 1970

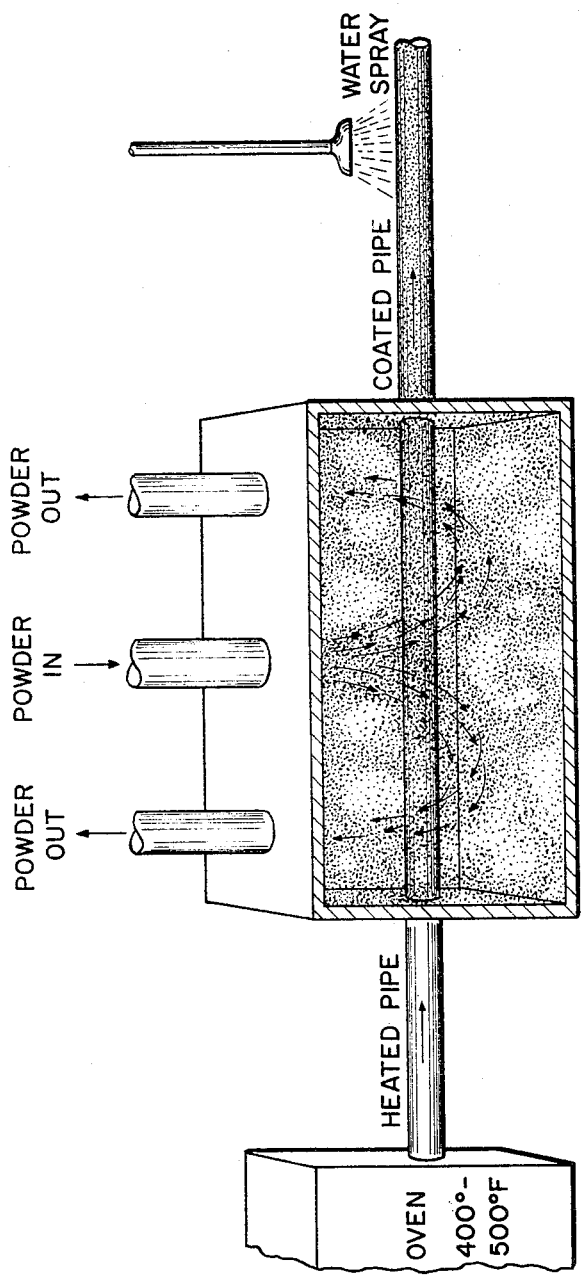

3,508,946
PIPE COATED WITH EPOXY RESIN COMPOSITION CURED WITH EXTRA-COORDINATE SILICON COMPLEX AND PROCESS FOR COATING SAID PIPE
Edwin P. Plueddemann and Harold L. Vincent, Midland, Mich., assignors to Dow Corning Corporation, Midland, Mich., a corporation of Michigan.
Original application Nov. 16, 1964, Ser. No. 412,590. Divided and this application Oct. 22, 1968, Ser. No. 769,541
Int. Cl. C08g 51/04; B44d 1/094
U.S. Cl. 117—18
43 Claims

ABSTRACT OF THE DISCLOSURE

A process is disclosed for coating pipe with an epoxy resin composition cured with an extracoordinate silicon complex which process comprises heating the pipe to a temperature such that the powdered coating composition will fuse and flow out into a smooth coating when the pipe is brought into contact therewith, passing the heated pipe through a cloud of the coating composition whereby it becomes coated, and then cooling the coated pipe.

---

This application is a division of application Ser. No. 412,590, now U.S. Patent 3,461,095, filed Nov. 16, 1964, which application was a continuation-in-part of the now abandoned application Ser. No. 358,504, filed Apr. 9, 1964, and now abandoned.

This invention relates to new curing systems or catalysts for epoxy resins. This invention also relates to protective coating compositions containing these new curing systems.

Much research has been devoted to the protection of materials, and in particular metals, from the action of corrosive substances. One area of particular concern is the corrosion of pipelines such as those used for gas and oil distribution and transportation where corrosion is a serious and costly problem. The most common means for protecting pipelines from corrosion has been the use of bituminous coatings. Such coatings, while better than nothing, were far from satisfactory because many failures occurred as a result of things such as faulty application of the coating, injuries to the coating during installation of the coated pipe and flowing or cracking of the coating during its service life. The more recent introduction of epoxy powders for coating pipelines has eliminated many of the faults associated with the older coating materials and is now in commercial use. The coating compositions of this invention represent a significant advance in the developments of protective coatings for materials generally and metals in particular. In the protection of metals, the coating compositions of this invention are especially useful for protecting pipelines from corrosion.

Ideally, coating compositions for pipelines should have the following characteristics. They should be fast curing, be relatively inexpensive and they should be capable of use with existing equipment. The resulting coating should have good adhesion, good impact resistance, be smooth in appearance, pinhole free, be reasonably flexible so that slight bending of the pipe doesn't cause cracking and the coating should offer cathodic protection and resistance to undercutting.

It is an object of this invention to provide protective coating compositions for materials generally and metals in particular. Another object is to provide coating compositions for pipelines which overcome many disadvantages of the currently available compositions and which approach being ideal coating compositions. A further object is to provide pipe coated with the compositions of this invention. It is also an object to provide new curing systems for epoxy resins. Still another object is to provide epoxy adhesive compositions that are stable (have good shelf life) at room temperature. These adhesive compositions can be solid or liquid and the solid adhesives can be in the form of supported or unsupported films. Other objects and advantages will become apparent from the following description, the examples and the claims.

More specifically, this invention relates to a composition comprising an epoxy resin and, as a curing agent therefor, a complex selected from the group consisting of complexes having the general formulae

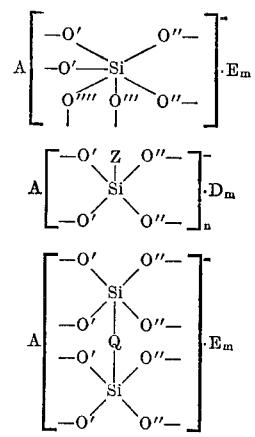

and mixtures thereof, wherein the O' oxygen atoms are attached to carbon atoms of an aromatic ring which are ortho to each other, the O" oxygen atoms are attached to carbon atoms of an aromatic ring which are ortho to each other, the O''' oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer and the ratio of anions to cations in (1) and (3) is such that there is an equal number of positive and negative charges in the complex.

This invention is also directed to a composition comprising an epoxy resin and, as a curing agent therefor, a composition comprising an anhydride of an organic acid and a complex selected from the group consisting of complexes having the general formulae

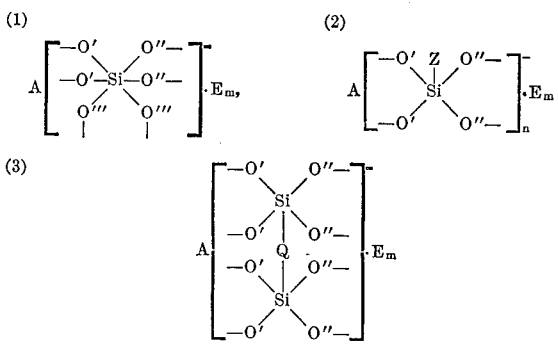

and mixtures thereof, wherein the O' oxygen atoms are attached to carbon atoms of an aromatic ring which are ortho to each other, the O" oxygen atoms are attached to carbon atoms of an aromatic ring which are ortho to each other, the O''' oxygen atoms are attached to carbon atoms of an aromatic ring which are ortho to each other, Z is a monovalent radical attached to the silicon atom via a silcon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer and the ratio of anions to cations in (1) and (3) is such that there is an equal number of positive and negative charges in the complex.

The invention further relates to a composition useful for providing protective coatings for metals which comprises about 100 parts of a solid epoxy resin, about 5 to 120 parts of a filler, and a curing agent consisting essentially of an anhydride of an organic acid and a complex selected from the group consisting of complexes having the general formulae (1) 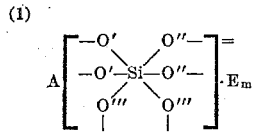  (2) 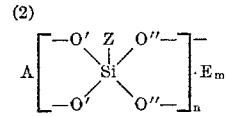

(3) 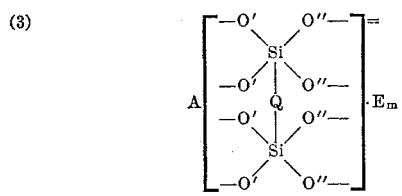

and mixtures thereof, wherein the O′ oxygen atoms are attached to carbon atoms of an aromatic ring which are ortho to each other, the O″ oxygen atoms are attached to carbon atoms of an aromatic ring which are ortho to each other, the O‴ oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer and the ratio of anions to cations in (1) and (3) is such that there is an equal number of positive and negative charges in the complex.

Still further, this invention relates to a process for coating pipe which comprises heating the pipe to a temperature such that the coating powder will fuse and flow out into a smooth coating when the pipe is brought into contact with a cloud of the powdered coating composition, passing the heated pipe through a cloud of a powdered coating composition, which is one of the above compositions, whereby the pipe becomes coated with the composition and thereafter cooling the coated pipe. The invention also relates to pipe coated by this process. When coating pipe it is preferred that the composition contain from 40 to 60 parts of the filler.

Any liquid or solid epoxy resin can be cured with the curing agents of this invention. The epoxy resins that can be employed are so well known to those skilled in the art that they will only be described very briefly and generally here. These materials are basically the reaction products of polyhydric phenols with either polyfunctional halohydrins or polyepoxides or mixtures of the two. Most commonly, the epoxy resins are a reaction product of bisphenol A (p,p′ - dihydroxydiphenyldimethylmethane) and epichlorohydrin. The term "epoxy resin," or its equivalents, as used herein is intended to include the well known combined or modified epoxy resins (such as the epoxy-novolak, epoxy-phenolic, epoxy-melamine and epoxy-silicone resins) as well as the bisphenol A type of epoxy resins. These combined or modified resins can be in the form of copolymers, blends or mixtures. In general, the solid epoxy resins are the preferred materials for the coating compositions, such as those used on pipe, while the liquid epoxy resins are the preferred materials for the adhesive compositions.

The agent employed to cure the epoxy resin can be any complex selected from the group consisting of complexes having the general formulae

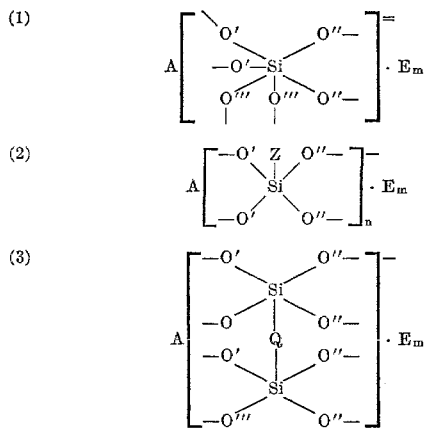

and mixtures thereof, wherein the O′ oxygen atoms are attached to carbon atoms of an aromatic ring which are ortho to each other, the O″ oxygen atoms are attached to carbon atoms of an aromatic ring which are ortho to each other, the O‴ oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer and the ratio of anions to cations in (1) and (3) is such that there is an equal number of positive and negative charges in the complex. Those complexes having the Formula 1, when $m$ is zero, are known materials and have been described along with their preparation by Rosenheim et al., Z. Anorg. Chem. 196, 160 (1931) and Weiss et al., Z. Anorg. Chem. 311, 151 (1961). These complexes are prepared by reacting silica or ethyl silicate (either the orthosilicate or polysilicate) with an aromatic compound having at least two hydroxy groups on the aromatic ring which are ortho to each other and an amine. The preparation of the complexes of Formula 1 when $m$ is a fraction, integer or a mixed number is set forth in the U.S. application filed concurrently herewith by Cecil L. Frye and entitled "Hexacoordinate Silicon Complexes" which has now matured into U.S. Patent No. 3,355,477. Briefly, the type of complex is formed when an excess of certain types of amines are employed in the above process.

The complexes having the Formulae 2 or 3 above are new materials. Their description and fully detailed methods for their preparation are set forth in the abandoned U.S. patent application Ser. No. 358,649, filed Apr. 9, 1964, by Cecil L. Frye and entitled "Pentacoordinate Silicon Complexes." These complexes and their method of preparation are also described in the U.S. patent application filed concurrently herewith by Cecil L. Frye and entitled "Pentacoordinate Silicon Complexes II" which has now matured into U.S. Patent No. 3,360,525. These new complexes are prepared by reacting silanes having the formulae $ZSiX_3$, $X_3SiQSiX_3$ or hydrolyzates of either with an aromatic compound having at least two hydroxy groups on the aromatic ring which are ortho to each other and an amine. Ideally, the compounds are reacted in silane to aromatic hydroxy compound to amine mole ratio of 1:2:1 in the case of the silanes $ZSiX_3$ and a mole ratio of 1:4:2 in the case of silanes $X_3SiQSiX_3$. Of course, when $m$ is to be greater than zero, an excess of amine is employed. In the silanes, Z and Q have the above defined meaning and X is a hydrolyzable group such as a halogen atom (fluorine, chlorine or bromine), an alkoxy group (methoxy, ethoxy, isopropoxy or butoxy), an aryloxy group (phenoxy), an acyloxiy group (acetoxy) or a —OCH$_2$CH$_2$OCH$_3$, —OCH$_2$CH$_2$OCH$_2$CH$_3$ or

—CH$_2$CH$_2$OH group. Reaction of the three ingredients can be carried out at room temperature or one can heat a mixture of the three reactants. The heating can vary from a simple warming of the mixture to heating the mixture at reflux for about 5 to 30 minutes or more.

In the above formulae Z can be any monovalent radical so long as it is attached to the silicon atom via a silicon-carbon bond. Thus, Z can be, for example, any aliphatic hydrocarbon radical such as a methyl, ethyl, propyl, butyl, amyl, octyl, decyl, dodecyl, octadecyl, vinyl, allyl or a propargyl radical; any cyclic hydrocarbon radical such as a cyclopentyl, cyclohexyl, phenyl, xenyl, naphthyl, tolyl, xylyl, mesityl, benzyl or a phenethyl radical; or any substituted hydrocarbon radical such as a chloromethyl, 3-chloropropyl, 3,3,3-trifluoropropyl, dichlorophenyl, p-bromobenzyl, α,α,α-trifluorotolyl, aminomethyl, aminoethyl, β-carboxyethyl, 3-mercaptopropyl, 3-cyanopropyl, 3-aminopropyl, —(CH$_2$)$_3$NH(CH$_2$)$_2$NH$_2$,

—CH$_2$CH(CH$_3$)CH$_2$NH(CH$_2$)$_2$NH$_2$

—(CH$_2$)$_3$NH(CH$_3$), —(CH$_2$)$_3$N≡C,

—(CH$_2$)$_3$OOCC(CH$_3$)=CH$_2$

—(CH$_2$)$_3$OCH$_2$CH$_3$, —(CH$_2$)$_3$OH, —C$_6$H$_4$OH,

—(CH$_2$)$_3$OC≡N

—(CH$_2$)$_3$NO$_2$, —(CH$_2$)$_3$SC≡N or a —CF=CF$_2$ radical.

In the above formulae Q can be any divalent radical attached to each silicon atom via a silicon-carbon bond. Thus, for example, Q can be any divalent ether radical or any divalent hydrocarbon radical such as —CH$_2$CH$_2$—, —CH$_2$CH$_2$CH$_2$—, —CH$_2$CH(CH$_3$)CH$_2$—,

—CH$_2$CH$_2$CH$_2$OCH$_2$CH$_2$CH$_2$—

, 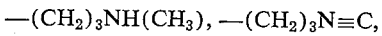,

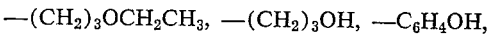

or
—CH$_2$CH$_2$CH$_2$OCH$_2$CH(OH)CH$_2$OCH$_2$CH$_2$CH$_2$—.

In the preparation of the complexes any aromatic compound having at least two hydroxy groups on the aromatic ring which are ortho to each other can be employed in the making of the complexes of this invention. Specific example of such compounds that can be employed are catechol, 3-methylcatechol, t-butylcatechol, pyrogallol, gallic acid, 4,5-dibromocatechol, 1,2-dihydroxynaphthalene, 2,3-dihydroxybiphenyl, 2,3,4-trihydroxybiphenyl, 2,3-dihydroxynaphthalene, alizarin, 3-nitroalizarin, 3-methylalizarin, 1,2-anthracenediol, anthragallol, anthrapurpurin, hexahydrobenzene, benzenetetrol, protocatechuic acid, adrenaline, caffeic acid, flavorpurpurin, gallacetophenone, gallanilide, gallein, gallin, 1,2,4-benzenetriol, hystazarin, isonaphthazarin, maclurin, phenanthahydroquinone, 2,3,4-trihydroxy-9-acridone, 2,3-dihydroxyquinoline, cyanidin chloride, 2,3-dihydroxypyridine, 3,4-dihydroxyacridine, 3,4-dihydroxybenzoic acid, quercetin, the methyl ester of gallic acid, 3,4,5-phenanthrenetriol, protocatechuldehyde, purpurin, 2,3-dihydroxybenzoic acid, quinalizarin, rufigallic acid and rufiopin.

The cation of the complex is formed from the amine used in the preparation of the complex. The term "amine" as employed herein is intended to include ammonia or ammonium hydroxide and quaternary ammonium compounds as well as the conventional amines. All manner of ternary nitrogen compounds such as primary, secondary and tertiary aliphatic or aromatic amines, alkanolamines, hydrazines, quanidines and heterocyclic compounds such as pyridines can be employed. Specific examples of suitable amines are methylamine, ethylamine, proplyamine, isopropylamine, butylamine, amylamine, hexylamine, decylamine, dodecylamine, octadecylamine, dimethylamine, diethylamine, methylamylamine, triethylamine, tripropylamine, diethylmethylamine, cyclohexylamine, benzyldimethylamine, aniline, dimethylaniline, toluidine, ethanolamine, diethanolamine, triethanolamine, ethylene diamine, cadaverine, hexamethylenediamine, diethylenetriamine, pyridine, H$_2$NCH$_2$CH$_2$CH$_2$(CH$_3$)$_2$SiOSi(CH$_3$)$_2$CH$_2$CH$_2$NH$_2$

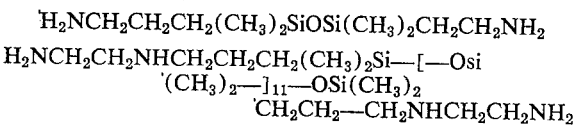

guanidine, tetramethylguanidine, melamine, cinchonine, strychnine, brucine, methylenedianiline, metaphenylenediamine, tetraethylenepentamine, methaxylylenediamine, tetramethylammonium hydroxide, trimethyl-beta-hydroxyethylammonium hydroxide, benzyltrimethylammonium hydroxide, cetyltrimethylammonium hydroxide, tallow-trimethylammonium hydroxide and 2,4,6-tris(dimethylaminomethyl)phenol. Mixtures of amines can be employed in making the complexes and for some uses such complexes are preferred.

As stated above, $n$ is an integer not greater than the valence of A. Thus, for example, when A is monovalent, $n$ is 1. When A is divalent, $n$ is 1 or 2. When A is trivalent, $n$ is 1, 2 or 3. When A is tetravalent, $n$ is 1, 2, 3 or 4, and so on. In speaking of valences with respect to the cations formed from amines, it might be well to mention here that it is the number of nitrogen atoms that become protonated during the reaction that are being referred to as the valence. Thus it should be obvious to those skilled in the art that in the case of polyamines one or more of the nitrogen atoms can become protonated. For example, ethylenediamine can form either the H$_2$NCH$_2$CH$_2$NH$_3$$^+$ cation or the $^+$H$_3$NCH$_2$CH$_2$NH$_3$$^+$ cation. As for the complees of the formulae (1) 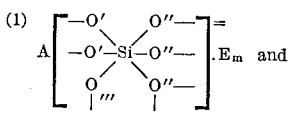 and (3) 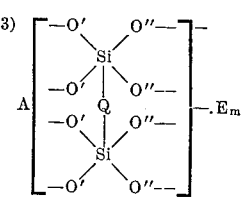

the ratio of the anions to cations is such that there is an equal number of positive and negative charges in the complex. Thus, for example, when A is monovalent there must be an anion to cation ratio of 1:2. When A is divalent, there must be an anion to cation ratio of 1:1. When A is trivalent, there must be an anion to cation ratio of 3:2 and so on. It should be understood that when A is polyvalent, divalent for example, that A can satisfy both valences of an anion or it can satisfy one valence of two different anions which another cation satisfies the other valence.

The disclosures of the Rosenheim et al. and Weiss et al. articles and the disclosures of the Frye applications are incorporated herein by reference.

Instead of employing the above complexes per se as the agent to cure the epoxy resin, a composition comprising an anhydride of an organic acid and a complex can be employed. In such a composition the anhydride is the primary curing agent while the complex functions as a "kicker" for the anhydride, that is, it accelerates or shortens the cure time. Specific examples of suitable anhydrides that can be employed are phthalic anhydride, hexahydrophthalic anhydride, methyl nadic anhydride, trimellitic anhydride, dodecenyl succinic anhydride, chlorendic anhydride, pyromellitic dianhydride, maleic anhydride, chlorosuccinic anhydride and succinic anhydride.

The amount of the complex and/or anhydride to be employed are generally not critical. When the complex used is prepared from a primary or secondary amine and used as the sole curing agent, an amount of complex should be used so as to provide about one active hydrogen in the complex per epoxy equivalent (plus or minus about 10 to 20%). When the complex used is prepared from a tertiary amine and used as the sole curing agent, an amount of complex should be used so as to provide the equivalent of about 3 to 15 parts of the amine per one hundred parts of the resin by weight. The anhydride is employed in an amount so as to provide about one gram mol of anhydride carboxyl per one gram mol of epoxy (plus or minus about 15 to 20%). When a tertiary amine is used in conjunction with the anhydride, generally 0.1 to 3 parts of the amine per hundred parts of resin are employed.

The above amounts of complex and anhydride are given as a general guidance. As those skilled in the art know, the actual amount used in practice will be determined by the evaluation of performance and properties of each material with respect to each individual situation.

The compositions of this invention containing the epoxy resin and curing agent are stable at room temperature and generally have a good shelf life. The compositions become cured at elevated temperatures. By varying the nature of the complex employed in the curing agent one can vary the rate and temperature of cure to fit various needs.

The compositions of this invention can also contain the conventional additives that are employed in epoxy resins for specific purposes. For example, the compositions can optionally contain extending resins, fillers, flow control agents, dyes, pigments, plasticizers, etc.

The compositions of this invention are particularly useful for providing protective coatings for materials. For example, the compositions can be used for coating wire, pipe, capacitors, stators and rotors. The compositions can also be used for molding and encapsulation purposes as well as many other purposes that will be obvious to those skilled in the art.

The process for coating pipe requires first that the pipe be heated to a temperature such that the coating powder will fuse and flow out into a smooth coating when the pipe is brought into contact with a cloud of the powdered coating composition. The exact temperature used will, of course, vary with the characteristics of the particular coating powder used. Generally speaking, however, a temperature in the range of 400 to 500° F. should be employed. Passing the pipe through an oven to heat it to the proper temperature has proven to be a satisfactory procedure. Next the heated pipe is passed through a cloud of the powdered coating composition. This is best accomplished by passing the pipe through a box while blowing the powdered coating composition into the box. This creates a cloud of the composition around the pipe. As the particles of the powdered composition come into contact with the heated pipe they stick to it, fuse, and flow out into a smooth coating. After the pipe leaves the box it is then cooled. Generally, the coated pipe is first quenched with a water spray to cool it enough so it can be handled and then it is allowed to cool to normal temperature. The quenching step is not essential but rather a matter of convenience and therefor desirable. The foregoing process is illustrated by the drawing which is labeled so as to be self-explanatory.

It has been found that by employing the above process and the compositions of this invention that it is now possible to produce coated pipe in which the coating has good adhesion, good impact resistance, is smooth in appearance, essentially pinhole free, relatively flexible and hence resistant to cracking, it provides good corrosion resistance and the coating is fast curing.

While the thickness of coating to be employed is up to the individual user, it is preferred that a coating of at least 5 mils thickness be used. For best results, a coating of at least 10 mils thickness is most preferred. It is usually desirable, however, that the best thickness for each particular application be determined by the individual.

The compositions of this invention can be prepared by any desired means. For example, the ingredients can simply be dry blended or the ingredients can be melt blended on a two roll mill. The best procedure known at this time for preparing the coating composition consists of a combination of these methods, i.e., all the ingredients except the anhydride are melt blended on a two roll mill and then the anhydride is dry mixed with the resultant melt blend. Other techniques that can be employed and that will work as well as those described above will be obvious to those skilled in the art.

In order that those skilled in the art can better understand how the present invention can be practiced, the following examples are given by way of illustration and not by way of limitation. All parts referred to herein are by weight and all viscosities measured at 25° C. unless otherwise specified.

EXAMPLE 1

To 100 parts of a low molecular weight liquid epoxy resin in an aluminum cup at 150° C. there was added 10 parts of a complex having the formula

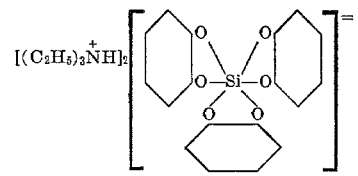

The resin was a reaction product of Bisphenol A and epichlorohydrin, had a viscosity of about 13,500 centipoises, an epoxide equivalent weight of about 190 and a specific gravity of 1.17. The epoxy resin rapidly cured to give a hard, tough solid which had good adhesion to the aluminum.

EXAMPLE 2

The procedure of Example 1 was repeated except that a complex having the formula

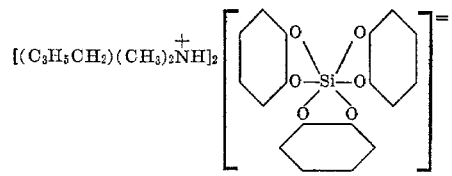

was employed instead of the triethylamine silicon catecholate and the mixture was placed in a 150° C. oven overnight. The epoxy resin cured to a solid.

EXAMPLE 3

A mixture of 10 g. of the epoxy resin of Example 1 and 2 g. of the benzyldimethylamine silicon catecholate of Example 2 was prepared and heated for 30 minutes at 70° C. The mixture did not set up showing the composition to be stable at this temperature. It was then placed in a 150° C. oven. After 15 minutes in the oven the resin had set up although the top was slightly tacky. After 16 hours in the oven the resin had cured to a hard, clear solid. The top surface had a Barcol hardness of 15 and the bottom surface a Barcol hardness of 25.

EXAMPLE 4

This example illustrates the fact that by varying the nature of the complex employed one can vary the rate of cure of the epoxy resin to fit particular needs.

In this example a mixture of 8 parts of the epoxy resin of Example 1 and 10 parts of a solid diphenyloxide phenolic resin was used. The phenolic resin, which is a well-known commercial material, had the general formula

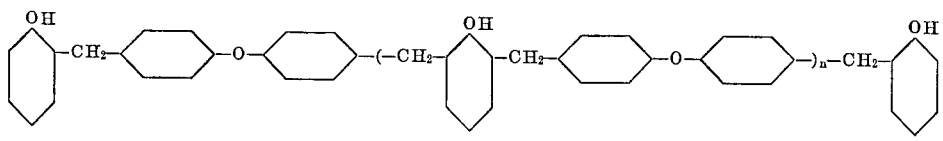

a softening point of 85–90° C. and a hydroxyl content of about 7–8%.

The rate of cure was determined by the stroke cure test which consists of putting the mixture of resins and curing agent on a hot plate set at "low" (about 150° C.) and then stroking the mixture with a spatula until it cures. The amount of curing agent used was about 0.1 gram. The curing agents employed had the following formulae:

(1) 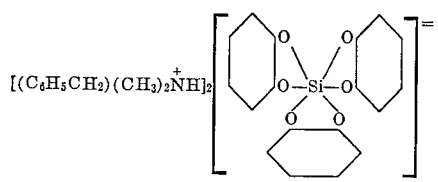

(2) 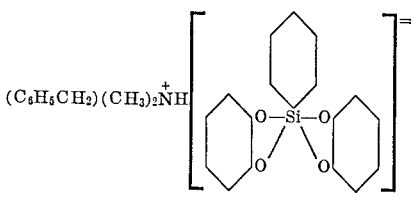

(3) 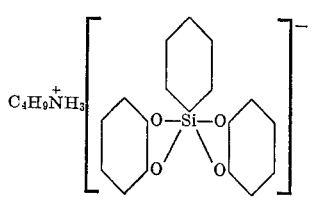

(4) 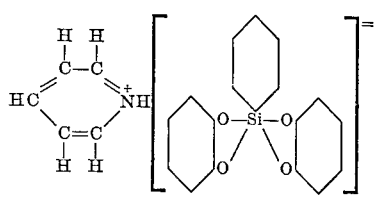

The results are set forth in the table below.

A laminate was made using the above solution employing the following procedure. The solution was diluted to 60% solids with acetone. Then a piece of 181 glass cloth containing a silicon finish and weighing 245.5 g. was soaked in 220 g. of solution and then dried. The dry cloth weighed 376 g. and had a resin pick-up of 34.8%. The resin was precured one minute at 110° C. The cloth was cut into plies 8 inches by 8 inches. Laminates were prepared which each contained 14 plies of the treated glass cloth laid up with the warp threads rotated 90° in alternate plies. The laminate was cured 30 minutes 30 p.s.i. and 150° C. No post cure was used. The cured resin was tough and heat stable. The laminate was tested for flexural and compressive strengths in accordance with U.S. Federal Specification L–P 406 b. Methods 1031 and 1021, respectively. Flexural and compressive strengths were also determined on laminates which had been boiled in water for 2 hours, this being a test recognized as roughly equivalent to standing in water at room temperature for one month. Results from the latter test are referred to as the "2 Hr. Boil" data. The results are set forth below.

Flexural strength _____ 80,700
Flexural strength—2 hr. boil _____ 68,000
Compressive strength _____ 47,500
Compressive strength—2 hr. boil _____ 37,800

EXAMPLE 6

This example illustrates the stability of the compositions of this invention.

A 75% solution of the epoxy resin of Example 1 in isopropylacetate was prepared. Ten grams of the solution was placed in each of six viscosity tubes. Then the curing agent was added. To two tubes 12 drops of benzyldimethylamine was added. To two others 1 g. of curing agent (1) of Example 4 was added. To the last two 1 g. of curing agent (2) of Example 4 was added. One set of tubes was held at room temperatures while the other set was held at 80° C. The change in viscosity is an indication of stability, i.e., the greater the increase in viscosity the less stable the composition. The benzyldimethylamine was included as a control for purposes of comparison. The results are set forth in the table below.

| | Time | | | |
|---|---|---|---|---|
| | 4 hours | | 20 hours | |
| Curing agent | Room temperature | 80° C. | Room temperature | 80° C. |
| Benzyldimethylamine | No change | Gelled | Sligh viscosity increase. | Gelled. |
| Benzyldimethylamine silicon catecholate | do | Slight viscosity increase. | No change | Do. |
| Benzyldimethylamine phenylsilicon catecholate. | do | No change | do | Viscous liquid. |

Curing agent:    Cure time (minutes)
None _____ >20
(1) _____ ½
(2) _____ 2
(3) _____ 4
(4) _____ 2½

EXAMPLE 5

100 g. of the phenolic resin, 80 g. of the epoxy resin and 5 g. of curing agent (1), all of Example 4, were dissolved in acetone to obtain a 67% solution. The solution had a stroke cure rate of 30 seconds on a hot plate set at "low."

EXAMPLE 7

A mixture of 10 g. of a solid epoxy resin and 1 g. of a complex having the formula

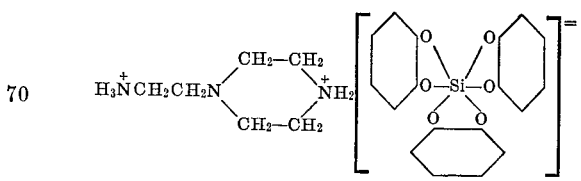

was prepared. The resin was a reaction product of Bisphenol A and epichlorohydrin, had an epoxide equivalent weight of about 925, a softening point of about 99° C., a refractive index of 1.5971 and a specific gravity of 1.183. Upon heating the mixture to 250° C. the epoxy resin cured in 20 minutes.

EXAMPLE 8

A mixture of 10 g. of the epoxy resin of Example 7 and 1.25 g. of a complex having the formula

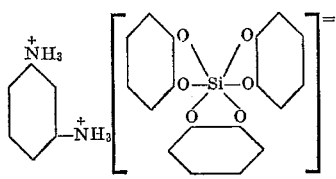

was prepared. Upon heating the mixture to 200° C. it becomes very viscous and sets in one minute. Upon cooling to room temperature the epoxy resin was found to be cured to a very tough, hard solid.

EXAMPLE 9

A mixture was prepared which consisted of 10 g. of the epoxy resin of Example 7 and 1 g. of a complex having the formula

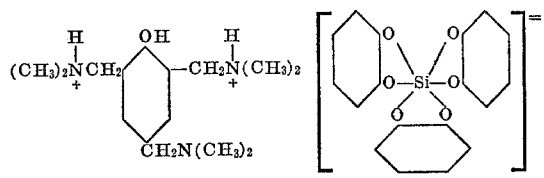

The mixture was heated to 250° C. where the epoxy resin very slowly cured.

EXAMPLE 10

A mixture was prepared which consisted of 10 g. of the epoxy resin of Example 7 and 1 g. of a complex having the formula

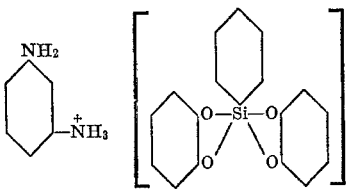

A good cure was obtained when the mixture was heated to 200° C., the epoxy resin setting in one minute. Upon cooling to room temperature, the cured resin was found to be hard and very tough. The cured resin was subjected to a drop impact test. This test consists of dropping a patty of the cured resin from various heights flat-wise onto a concrete floor. If the patty does not break the cured resin is considered to be very tough and has passed the test. If the patty breaks, the extent to which it breaks up is an indication of the toughness of the cured resin. The patty from this example passed this test, i.e., it did not break in a 12 foot fall.

EXAMPLE 11

8 g. of the epoxy resin of Example 7 and 2 g. of the phenolic resin of Example 4 were melted together at about 200° C. Then 1 g. of complex (2) of Example 4 was added to the mixture whereupon the mixture set to a clear solid in about 2 minutes. In the drop test, a patty of this cured resin broke in a 6 foot fall. The cured resin is moderately brittle at room temperature.

EXAMPLE 12

A powdered coating composition was prepared which consisted essentially of 100 parts of the epoxy resin of Example 7, 14 parts of trimellitic anhydride, 2 parts of the 2,4,6-tris(dimethylaminomethyl)phenol silicon catecholate complex of Example 9, 60 parts of a talc filler, 3 parts of a silicone resin flow control agent, 5 parts of titanium dioxide pigment and 0.5 part of red iron oxide pigment. This composition had a gel time of 9 seconds at 400° F. Metal panels 1″ x 4″ and 60 mils thick were coated with the composition by preheating the panel to 455° F., coating the panel with the powder, allowing the coating to cure for various lengths of time and then cooling the panel with cold water. The coating on the panel was then tested for impact resistance on a Gardner Impact Tester. The tester employed was essentially the same as the one described on page 147 of the "Paint Testing Manual, Physical and Chemical Examination Paints, Varnishes, Lacquers and Colors," Twelfth Edition, March 1962 by Gardner and Seward. The actual tester employed in the tests below had a four pound, round-nose steel impact rod and the scale along the slot gave inch pounds of impact from 0 to 160 in steps of 4. The test consists of placing a coated metal panel (coated side up) on the base plate, lifting the impact rod to the desired level, and then allowing the rod to drop onto the panel. Testing was started at 30 inch-pounds of impact. This procedure is repeated increasing the impact force each time until the impact destroys the coating. This value is then reported as the "Impact" resistance of the coating in inch-pounds. When a minus value of inch-pounds is reported, this means that the coating provides impact resistance which is less than the specified value. When a plus value of inch-pounds is reported, this means that the coating provides impact resistance which exceeds the specified value or in the case of 160+ inch-pounds the impact resistance exceeds the limits of the equipment used for testing this property. The cure times and results of the impact tests are set forth in the table below.

| Cure time (seconds): | Impact (inch-pounds) |
| --- | --- |
| 30 | −30 |
| 45 | −30 |
| 60 | 70 |
| 75 | 155 |
| 90 | 160 |
| 120 | 160 |

For purposes of comparison, a powdered coating composition was prepared which was identical to the above composition except that 1 part of a polyvinyl-butyral resin flow control agent was substituted for the 3 parts of silicone resin flow control agent and a mixture of 0.88 part of phenyltrimethoxysilane, 0.97 part catechol and 0.59 part 2,4,6-tris(dimethylaminomethyl)phenol was substituted for the complex. The amounts of silane, catechol and amine were the amounts needed to make two parts of the complex. This composition had a gel time of 11 seconds at 400° F. Metal panels were coated with this composition and the coatings tested for impact resistance employing the above procedures. The cure times and the test results are set forth in the table below.

| Cure time (seconds): | Impact (inch-pounds) |
| --- | --- |
| 30 | −30 |
| 45 | −30 |
| 60 | −30 |
| 75 | 105 |
| 90 | 105 |
| 120 | 150 |

EXAMPLE 13

A powdered coating composition was prepared which consisted essentially of 100 parts of the epoxy resin of Example 7, 50 parts of a talc filler, 14 parts of trimellitic anhydride and 2 parts of a complex having the formula

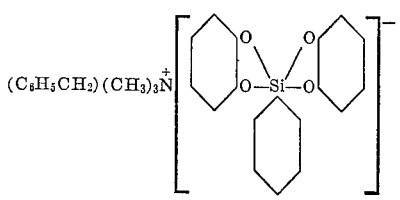

The composition had a gel time of 5 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | 160+ |
| 45 | 160+ |
| 60 | 160+ |
| 75 | 160+ |
| 90 | 160+ |
| 120 | 160+ |

EXAMPLE 14

A powdered coating composition was prepared which consisted essentially of 100 parts of the epoxy resin of Example 7, 17.8 parts of 3,3′,4,4′-benzophenone tetracarboxylic dianhydride, 2 parts of complex (2) of Example 4, 60 parts of a talc filler and 3 parts of a silicone resin flow control agent. The composition had a gel time of 5 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | 160+ |
| 45 | 160+ |
| 60 | 160+ |
| 90 | 160+ |
| 120 | 160+ |

For purposes of comparison, a powdered coating composition was prepared which was identical to the above composition except that the 2 parts of complex were omitted. This composition had a gel time of 13 seconds at 400° F. Metal panels were coated with this composition and the coatings tested for impact resistance employing the procedures of Example 12. The cure times and test results are set forth in the table below.

| Cure time (seconds): | Impact (inch-pounds) |
|---|---|
| 30 | −30 |
| 45 | −30 |
| 60 | 45 |
| 75 | 75 |
| 90 | 120+ |
| 120 | 160+ |

EXAMPLE 15

A powdered coating composition was prepared which consisted essential of 100 parts of the epoxy resin of Example 7, 8 parts of trimellitic anhydride, 2 parts of complex (2) of Example 4, 60 parts of talc filler, 1 part of a polyvinylbutyral resin flow control agent, 5 parts of titanium dioxide pigment and 1 part of a brown iron oxide pigment. The composition had a gel time of 8 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | 45 |
| 45 | 160+ |
| 60 | 160+ |
| 75 | 160+ |
| 90 | 160+ |
| 120 | 160+ |

For purposes of comparison, a powdered coating composition was prepared which was identical to the above composition except that a mixture of 0.87 part of phenyltrimethoxysilane, 0.97 part of catechol and 0.59 part of benzyldimethylamine was substituted for the 2 parts of complex. The amounts of the silane, catechol and amine were the amounts needed to make two parts of the complex. This composition had a gel time of 9 seconds at 400° F. Metal panels were coated with this composition and the coatings tested for impact resistance employing the procedures of Example 12. The cure times and test results are set forth in the table below.

| Cure time (seconds) | Impact (inch-pounds) |
|---|---|
| 30 | −30 |
| 45 | 45 |
| 60 | 105 |
| 75 | 160+ |
| 90 | 160+ |

EXAMPLE 16

A powdered coating composition was prepared which consisted essentially of 100 parts of the epoxy resin of Example 7, 16.5 parts of tetrahydrophthalic anhydride, 4 parts of complex (2) of Example 4, 60 parts of a talc filler and 3 parts of a silicone resin flow control agent. The composition had a gel time of 15 seconds at 400° F. Pieces of 1 inch and 2 inch pipe were heated to 455° F., coated with the composition, the coating allowed to cure 25 seconds and then the coated pipe cooled with cold water. The coatings were tested for impact resistance at 160 inch-pounds of impact employing the same procedure and equipment as used for the panels in Example 12. The coatings were found to have very good impact resistance, that is, they rated 160+ in the test.

EXAMPLE 17

A powdered coating composition was prepared which consisted essentially of 100 parts of the epoxy resin of Example 7, 60 parts of a talc filler, 1 part of a polyvinyl butyral resin flow control agent, 14 parts of trimellitic anhydride and 2 parts of the complex of Example 9. The composition had a gel time of 14 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | −30 |
| 45 | −30 |
| 60 | −30 |
| 75 | 75 |
| 90 | 160+ |

EXAMPLE 18

A powdered coating composition was prepared which consisted essentially of 100 parts of the epoxy resin of Example 7, 3 parts of a silicone resin flow control agent and 11.54 parts of a complex having the formula

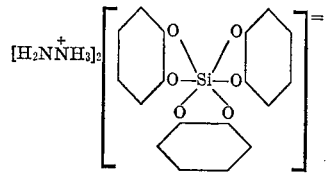

The composition had a gel time of 41.9 seconds at 347° F.

EXAMPLE 19

A powdered coating composition was prepared which consisted essentially of 100 parts of the epoxy resin of Example 7 and 19.5 parts of a complex having the formula

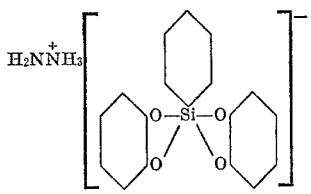

The composition had a gel time of 25.9 seconds at 347° F.

EXAMPLE 20

A powdered coating composition was prepared which consisted essentially of 100 parts of the epoxy resin of Example 7 and 11.4 parts of a complex having the formula

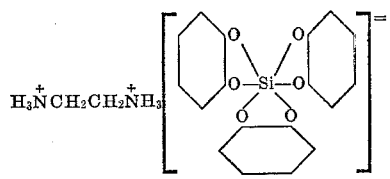

The composition had a gel time of 69.1 seconds at 347° F.

EXAMPLE 21

A powdered coating composition was prepared which consisted essentially of 100 parts of a solid epoxy resin and 8 parts of a complex having the formula

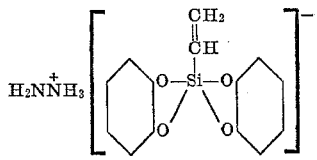

The resin was a reaction product of Bisphenol A and epichlorohydrin, had an epoxide equivalent of about 1800, a softening point of about 125° C., a refractive index of 1.5971 and a specific gravity of 1.180. The composition had a gel time of 47.1 seconds at 347° F. and 21.1 seconds at 400° F.

EXAMPLE 22

A powdered coating composition was prepared which consisted essentially of 100 parts of the epoxy resin of Example 7 and 8 parts of a complex having the formula

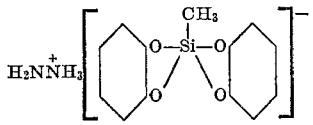

The composition had a gel time of 45.9 seconds at 347° F.

EXAMPLE 23

A powdered coating composition was prepared which consisted essentially of 100 parts of the epoxy resin of Example 7, 60 parts of a talc filler, 3 parts of a silicone resin flow control agent, 5 parts of a titanium dioxide pigment, 14 parts of trimellitic anhydride and 2 parts of a complex having the formula

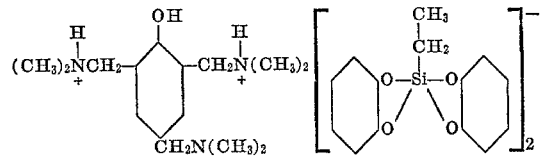

The composition had a gel time of 17 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | −30 |
| 45 | −30 |
| 60 | 70 |
| 75 | 110 |
| 90 | 160+ |
| 120 | 160+ |

EXAMPLE 24

Three powdered coating compositions were prepared which consisted essentially of 100 parts of the epoxy resin of Example 7, 60 parts of a talc filler, 1 part of a polyvinylbutyral resin flow control agent, 8 parts of trimellitic anhydride and complex (2)-of Example 4. The compositions are identified below as A, B and C and contained 0.5, 1.0 and 1.5 parts, respectively, of the complex. Compositions A, B and C had gel times of 15 seconds, 11 seconds and 9 seconds, respectively, at 400° F. Metal panels were coated with the compositions and the coatings tested for impact resistance employing the procedures of Example 12. The cure times and test results are set forth in the table below.

| Cure time (seconds) | 30 | 45 | 60 | 75 | 90 | 120 |
|---|---|---|---|---|---|---|
| Impact (inch-pounds): | | | | | | |
| A | −30 | −30 | −30 | −30 | 45 | 140 |
| B | −30 | −30 | −30 | 45 | 60 | 105 |
| C | −30 | −30 | 45 | 105 | 140 | 160+ |

EXAMPLE 25

A powdered coating composition was prepared which consisted essentially of 100 parts of the epoxy resin of Example 7, 60 parts of a talc filler, 3 parts of a silicone butyral resin flow control agent, 11.6 parts of 1,2,3,4-cyclopentane tetracarboxylic dianhyride and 4 parts of complex (2) of Example 4. The composition had a gel time of 7 seconds at 400° F.

EXAMPLE 26

A powdered coating composition was prepared which consisted essentially of 100 parts of the epoxy resin of Example 7, 60 parts of a talc filler, 3 parts of a silicone resin flow control agent, 11 parts of succinic anhydride and 2 parts of complex (2) of Example 4. The composition had a gel time of 15 seconds at 400° F.

EXAMPLE 27

A powdered coating composition was prepared which was identical to that of Example 25 except that 16.3 parts of phthalic anhydride was substituted for the anhydride in that composition. This composition had a gel time of 13 seconds at 400° F.

EXAMPLE 28

A powdered coating composition was prepared which consisted essentially of 100 parts of the epoxy resin of Example 7, 60 parts of a talc filler, 3 parts of a silicone resin flow control agent, 12 parts of pyromellitic dianhydride and 2 parts of a complex having the formula

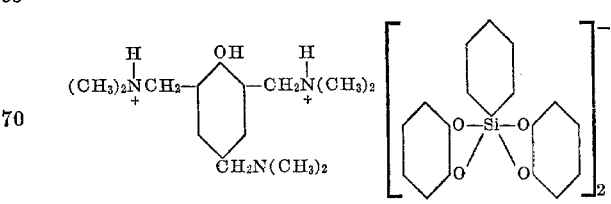

The composition had a gel time of 9 seconds at 400° F.

EXAMPLE 29

A powdered coating composition was prepared which consisted essentially of 100 parts of the epoxy resin of Example 7, 60 parts of a talc filler, 3 parts of a silicone resin flow control agent, 8 parts of glycerine tris-trimellitic anhydride and 2 parts of complex (2) of Example 4. The composition had a gel time of 5 seconds at 400° F.

EXAMPLE 30

A powdered coating composition which was identical to that of Example 29 except that 14 parts of ethylene glycol bis-trimellitic anhydride was substituted for the anhydride in that composition. This composition had a gel time of 6 seconds at 400° F.

EXAMPLE 31

A powdered coating composition was prepared which consisted essentially of 100 parts of the epoxy resin of Example 7, about 50 parts of a talc filler, 3 parts of a silicone resin flow control agent, about 3 parts of pigment, 14 parts of trimellitic anhydride and 2 parts of the complex of Example 9.

Pipe was coated with the above composition using the following procedure: The pipe was first heated to a temperature of about 450° F. by passing it through an oven. The heated pipe was then passed into a coating chamber. The chamber contained openings for introducing and removing the coating composition. The coating composition was continuously blown into and removed from the chamber. This procedure maintains a cloud of the coating composition within the chamber. As the particles of the coating composition came into contact with the heated pipe, they adhered to the pipe, fused and flowed out into a smooth coating. Twenty seconds after the coated pipe left the chamber it was quenched with a water spray and then allowed to cool to normal temperature. The resulting coating was about 10 mils thick.

The coating on the pipe produced by the above process had good adhesion, good impact resistance, was smooth in appearance, essentially pinhole free and provided good corrosion resistance.

EXAMPLE 32

When any of the following complexes are substituted for the complexes in the above examples, similar results are obtained.

(1)
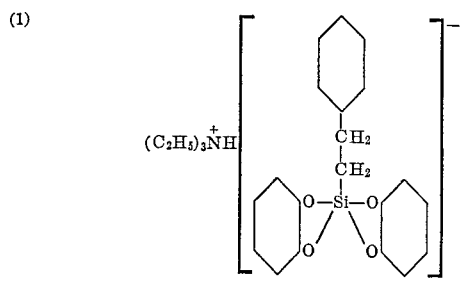

(2)
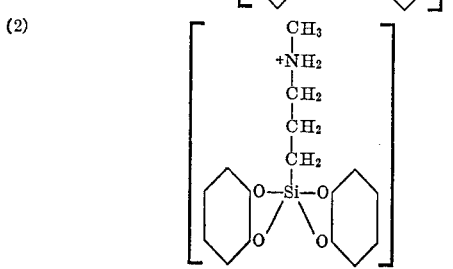

(3)
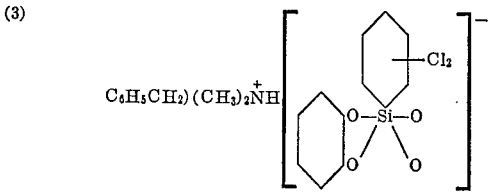

(4) Any of the products of Examples 20 and 21 in the above identified Frye application Ser. No. 358,649, except the sodium salt in Example 21.

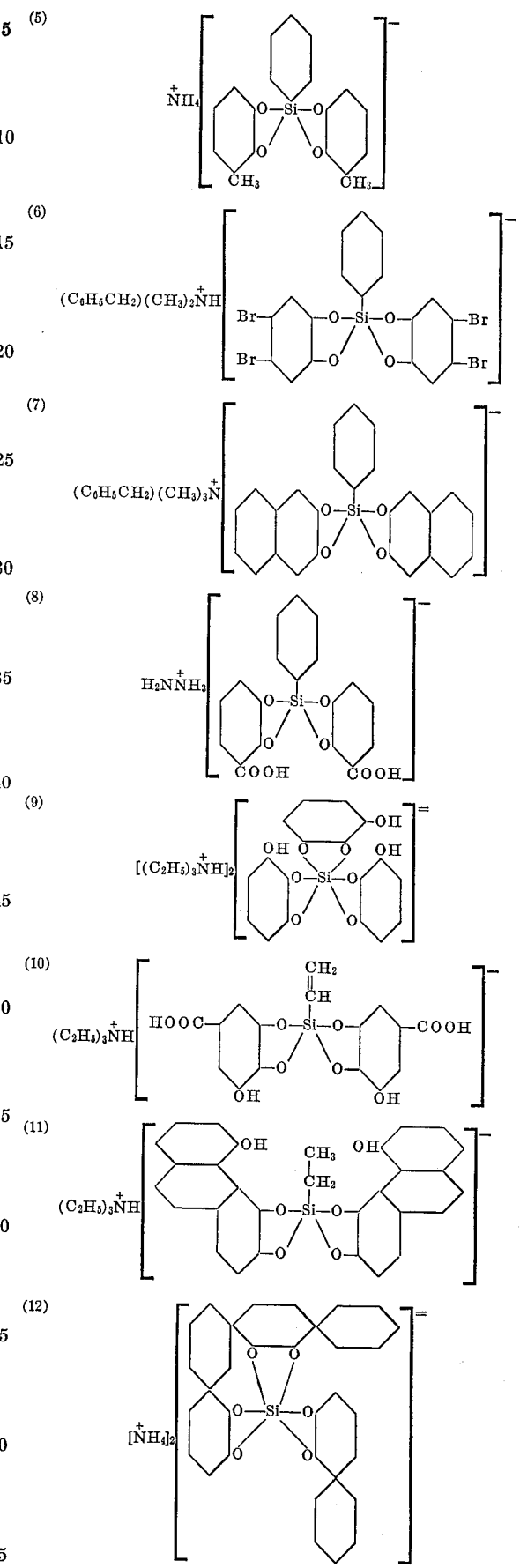

EXAMPLE 33

A moulding compound was prepared which consisted essentially of 180 grams of an epoxy-novalak resin, 474.5 grams of finely divided quartz filler, 7 grams of zinc stearate release agent, 7 grams of a black pigment, 94 grams of pyromellitic dianhydride and 4.5 grams of a complex having the formula $$[(CH_3)_2\overset{+}{N}-\underset{\underset{NH_2}{\|}}{C}-N(CH)_2]_2 \left[ \underset{\text{silicate complex}}{} \right]^=$$

The anhydride was dry mixed with some of the filler. The complex was also dry mixed with another portion of the filler. Then the resin, release agent, pigment and remaining filler were dry mixed and placed on a two roll mill using one warm and one cold roll. After these ingredients had been mixed, the anhydride-filler mixture was added and milled in. Then the complex-filler mixture was added and milled in with mixing being continued for about 3 minutes afterwards. The resulting composition was a hard putty at room temperature.

The above composition was subjected to the spiral flow test. This test indicates how far a material will flow under heat and pressure before the resin gels. This test simulates the use of the composition for transfer molding. The following procedure was employed in the test. A 50 gram sample of the composition was preformed into a 2-inch slug under 10 tons gauge pressure. The slug was then placed in a flow tester mold and molded for one minute at 350° F. and 800 p.s.i. of pressure. The mold was then opened and the flow of the composition found to be 16 inches with the spiral set hard.

Two bars ½ inch by ¼ inch by 5 inches were also transfer molded hard in 2 minutes from the above composition.

A four inch disk molded from the above composition was set very hard after 3 minutes.

EXAMPLE 34

A powdered coating composition was prepared which consisted essentially of 100 parts of the epoxy resin of Example 7 and 19.8 parts of a complex having the formula $$\left[ \overset{+}{H_3N}CH_2CH_2\overset{+}{NH_3} \left[ \text{silicate complex} \right] \right]_2^-$$

The composition had a gel time of 107 seconds at 347° F.

EXAMPLE 35

A powdered coating composition was prepared which consisted essentially of 100 parts of the epoxy resin of Example 7 and 5.5 parts of a complex having the formula $$[H_2NCH_2CH_2\overset{+}{NH_3}]_2 \left[ \text{silicate complex} \right]^= (H_2NCH_2CH_2NH_2)_{1/5}$$

The composition had a gel time of 14 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | −30 |
| 45 | +160 |
| 60 | +160 |
| 75 | +160 |
| 90 | +160 |
| 120 | +160 |

EXAMPLE 36

A powdered coating composition was prepared which consisted essentially of 100 parts of the epoxy resin of Example 7 and 4.9 parts of a complex having the formula $$[H_2NCH_2CH_2\overset{+}{NH_3}]_2 \left[ \text{silicate complex} \right]^= (H_2NCH_2CH_2NH_2)_{3/4}$$

The composition had a gel time of 11 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | 45 |
| 45 | +160 |
| 60 | +160 |
| 75 | +160 |
| 90 | +160 |
| 120 | +160 |

EXAMPLE 37

A powdered coating composition was prepared which consisted essentially of 100 parts of the epoxy resin of Example 7 and 6.3 parts of a complex having the formula $$\begin{array}{c}[H_2NCH_2CH_2\overset{+}{NH_3}]\\[H_2NCH_2CH_2NHCH_2CH_2\overset{+}{NH_3}]\end{array} \left[ \text{silicate complex} \right]^=$$

The composition had a gel time of 15 seconds at 400° F.

EXAMPLE 38

A powdered coating composition was prepared which consisted essentially of 100 parts of the epoxy resin of Example 7 and 4.2 parts of a complex having the formula $$[H_2N\overset{+}{N}H_3]_2 \left[ \text{silicate complex} \right]^- (H_2NNH_2)$$

The composition had a gel time of 3 minutes at 400° F.

EXAMPLE 39

A powdered coating composition was prepared which consisted essentially of 100 parts of the epoxy resin of Example 7, 50 parts of a silica filler, 2 parts of titanium dioxide, 10 parts of a phenolic resin flow control agent, 0.25 part of lampblack and 8 parts of a complex having the formula $$[H_2NCH_2CH_2\overset{+}{NH_3}]_2 \left[ \text{silicate complex} \right]^-$$

The composition had a gel time of 12 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | −30 |
| 45 | 30 |
| 60 | 60 |
| 75 | 60 |
| 90 | 75 |
| 120 | 75 |

EXAMPLE 40

A powdered coating composition was made that was identical to that of Example 39 except that 0.5 part of silicone flow control agent was substituted for the 10 parts of phenolic resin flow control agent. The composition had a gel time of 14 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | −30 |
| 45 | 75 |
| 60 | 105 |
| 75 | 150 |
| 90 | 150 |
| 120 | 150 |

EXAMPLE 41

A powdered coating composition was prepared which consisted essentially of 100 parts of the epoxy resin of Example 7, 50 parts of aluminum oxide, 1 part lampblack, 3 parts titanium dioxide, 3 parts of a silicone resin flow control agent and 6.5 parts of the complex of Example 39. The composition had a gel time of 10 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | 75 |
| 45 | 140 |
| 60 | 140 |
| 75 | 140 |
| 90 | +160 |
| 120 | +160 |

EXAMPLE 42

A powdered coating composition was prepared which consisted essentially of 100 parts of the epoxy resin of Example 7, 50 parts of a silica filler, 1 part of lampblack and 10.5 parts of a complex having the formula

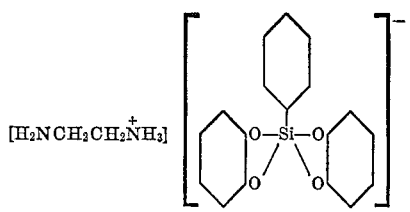

The composition had a gel time of 5 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | 45 |
| 45 | 45 |
| 60 | 75 |
| 75 | 105 |
| 90 | +160 |

EXAMPLE 43

A powdered coating composition was prepared which consisted essentially of 100 parts of the epoxy resin of Example 7, 50 parts of aluminum oxide, 3 parts titanium dioxide, 3 parts of a silicone resin flow control agent, 1 part lampblack and 9 parts of a complex having the formula

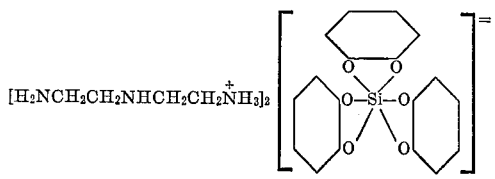

The composition had a gel time of 13 seconds at 400° F. Metal panels were coated with the composition and the coatings tested for impact resistance employing the procedures of Example 12. The cure times and test results are set forth in the table below.

| Cure time (seconds): | Impact (inch-pounds) |
|---|---|
| 30 | −30 |
| 45 | −30 |
| 60 | −30 |
| 75 | 45 |
| 90 | 105 |
| 120 | +160 |

EXAMPLE 44

A supported epoxy adhesive was made as follows. A heat cleaned glass cloth was precoated with a 20% solvent solution of the liquid epoxy resin of Example 1 and then air dried. The glass cloth was then coated with a composition consisting essentially of 100 parts of a solid epoxy resin, 17 parts of trimellitic anhydride and 2 parts of complex (2) of Example 4, coating being accomplished by dipping the cloth twice in a fluid bed of the composition. The cloth was placed in a 300° F. oven for 10 seconds following each dip. The quality of the adhesive was checked employing the lap shear test as described in ASTM-D 1002. The aluminum panels employed were vapor honed, and acid etched, the above adhesive applied and then the adhesive cured for 1½ or 3 minutes at 350° F. A ½-inch overlap was used between the panels. The room temperature strength after 1½ minutes cure was 2950 p.s.i. and after 3 minutes cure it was 3430 p.s.i.

EXAMPLE 45

The procedure of Example 44 was repeated except that nylon cloth was used instead of glass cloth, only one dip in the fluid bed was made and after dipping the cloth was placed in the 300° F. oven for 15 seconds. The quality of the adhesive was tested in the lap shear test as in the preceding example, the room temperature strength after 1½ minutes cure being 1590 p.s.i. and after 3 minutes cure it was 1930 p.s.i.

EXAMPLE-46

An unsupported epoxy adhesive was made as follows. 100 parts of the liquid epoxy resin of Example 1 and 35 parts of the complex of Example 39 were milled together. The resulting adhesive was a pasty material. The quality of the adhesive was tested in the lap shear test as in Example 44. The room temperature strength after a 2 minute cure at 450° F. was 2908 p.s.i.

That which is claimed is:

1. A process for coating pipe which comprises heating the pipe to a temperature such that the coating powder will fuse and flow out into a smooth coating when the pipe is brought into contact with a cloud of the powdered coating composition, passing the heated pipe through a cloud of a powdered coating composition comprising about 100 parts by weight of a solid epoxy resin having more than one vicinal epoxy group per molecule, about 40 to 60 parts by weight of a filler, a cyclic anhydride of a polycarboxylic organic acid, and a complex selected from the group consisting of complexes having the general formulae (1) 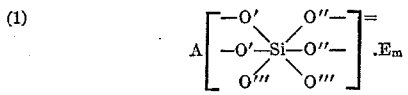

(2) 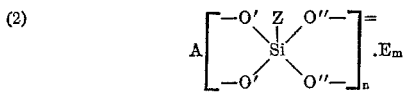

(3) 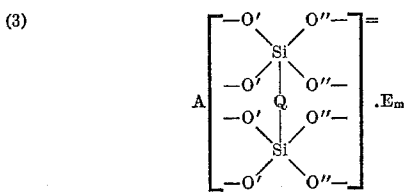

and mixtures thereof, wherein the O′ oxygen atoms are attached to carbon atoms of an aromatic ring which are ortho to each other, the O″ oxygen atoms are attached to carbon atoms of an aromatic ring which are ortho to each other, the O‴ oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer, and the ratio of anions to cations in (1) and (3) is such that there is an equal number of positive and negative charges in the complex, whereby the pipe becomes coated with the composition, and thereafter cooling the coated pipe.

2. The process of claim 1 wherein the anhydride is selected from the group consisting of trimellitic anhydride, pyromellitic dianhydride, phthalic anhydride, hexahydrophthalic anhydride, methyl nadic anhydride, dodecenylsuccinic anhydride and chlorendic anhydride.

3. The process of claim 2 wherein the complex has the general formula

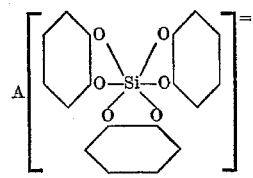

4. The process of claim 3 wherein the complex is selected from the group consisting of

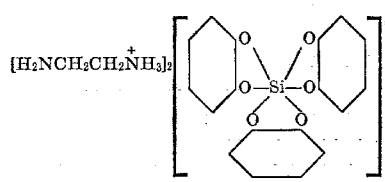

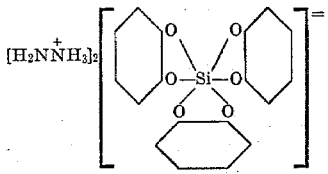

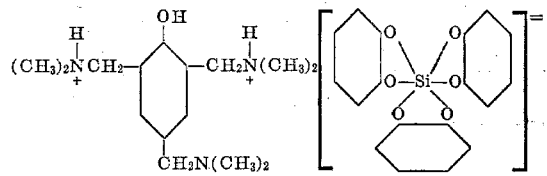

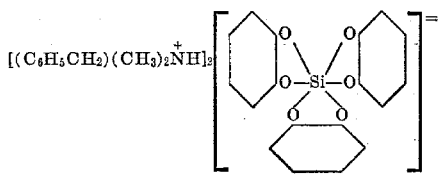

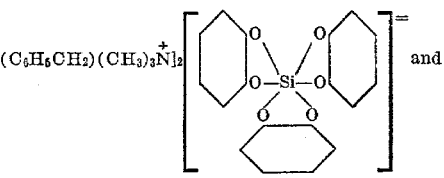 and

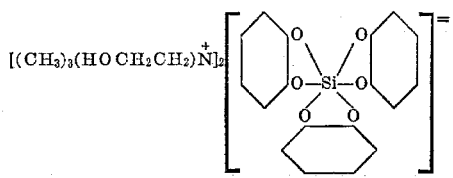

5. The process of claim 4 wherein the filler in the composition is a talc filler, and a flow control agent and a pigment are also included in the composition.

6. The process of claim 4 wherein the filler in the composition is a silica filler, and a flow control agent and a pigment are also included in the composition.

7. The process of claim 2 wherein the complex has the general formula

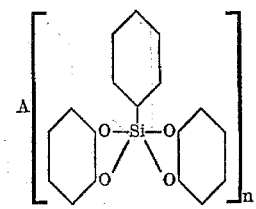

8. The process of claim 7 wherein the complex is selected from the group consisting of

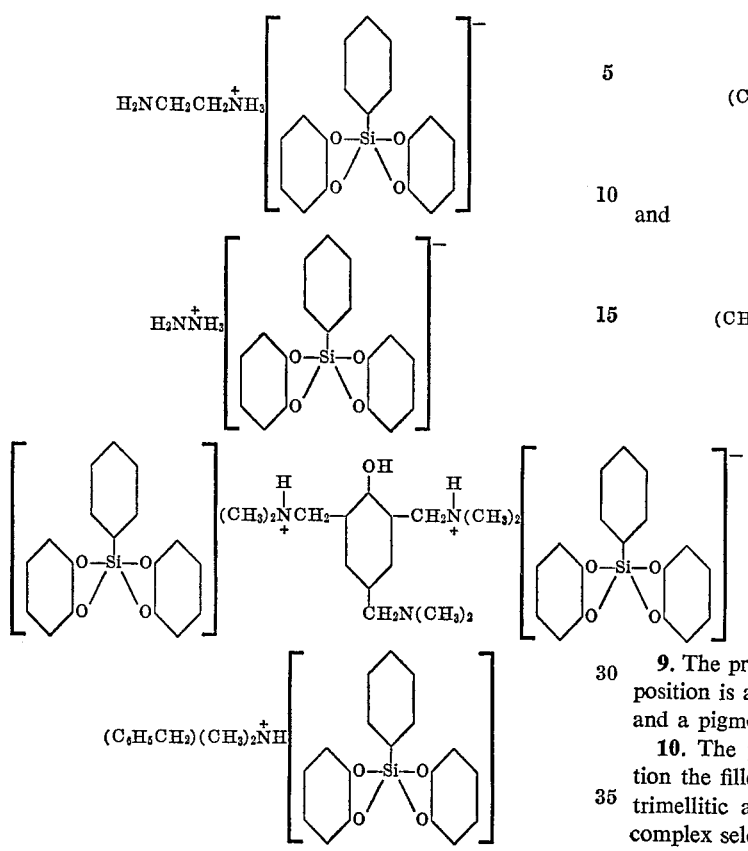

9. The process of claim 8 wherein the filler in the composition is a talc or silica filler, and a flow control agent and a pigment are also included in the composition.

10. The process of claim 9 wherein in the composition the filler is talc, there is 7 to 15 parts by weight of trimellitic anhydride, and 1 to 3 parts by weight of a complex selected from the group consisting of

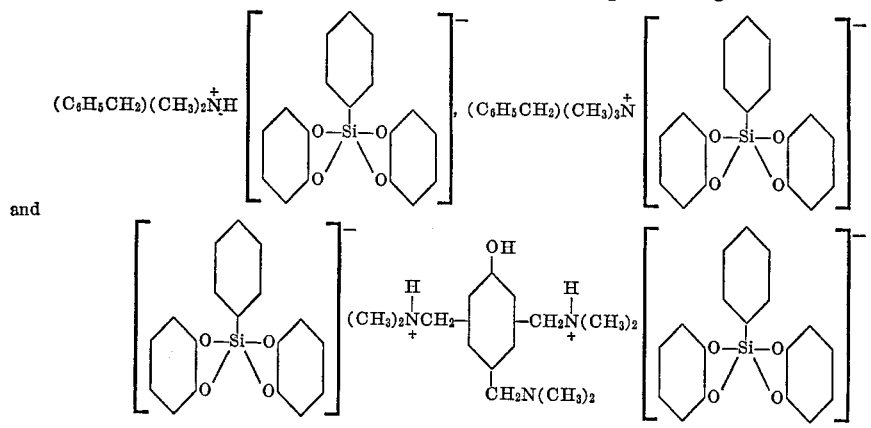

11. The process of claim 9 wherein in the composition the filler is silica, there is 7 to 15 parts by weight of trimellitic anhydride, and 1 to 3 parts by weight of a complex selected from the group consisting of

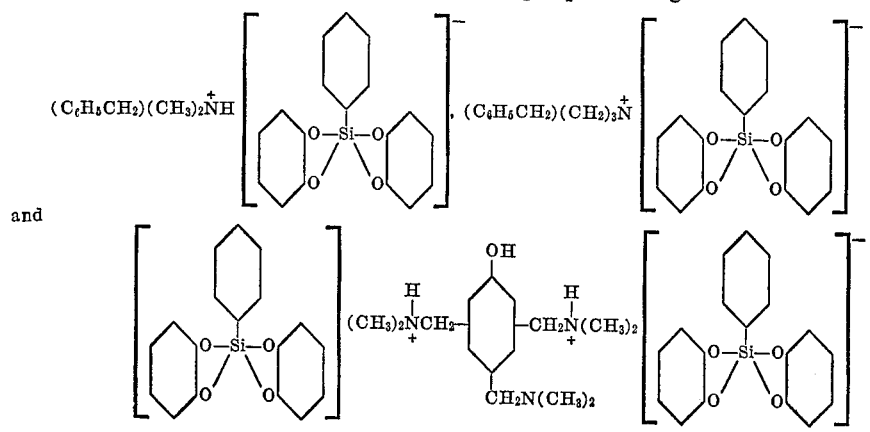

12. A process for coating pipe which comprises heating the pipe to a temperature such that the coating powder will fuse and flow out into a smooth coating when the pipe is brought into contact with a cloud of the powdered coating composition, passing the heated pipe through a cloud of a powdered coating composition comprising about 100 parts by weight of a solid epoxy resin having more than one vicinal epoxy group per molecule, about 40 to 60 parts by weight of a filler, and a complex selected from the group consisting of complexes having the general formulae (1)

(2)

(3)

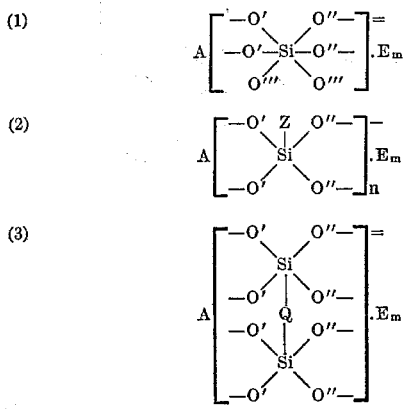

and mixtures thereof, wherein the O' oxygen atoms are attached to carbon atoms of an aromatic ring which are ortho to each other, the O" oxygen atoms are attached to carbon atoms of an aromatic ring which are ortho to each other, the O''' oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer, and the ratio of anions to cations in (1) and (3) is such that there is an equal number of positive and negative charges in the complex, whereby the pipe becomes coated with the composition, and thereafter cooling the coated pipe.

13. The process of claim 12 wherein the complex has the general formula

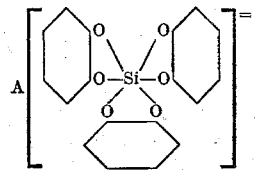

14. The process of claim 13 wherein the filler in the composition is a talc or silica filler, and a flow control agent and a pigment are also included in the composition.

15. The process of claim 14 wherein in the composition the filler is talc, and there is a complex selected from the group consisting of 6 to 10 parts by weight of

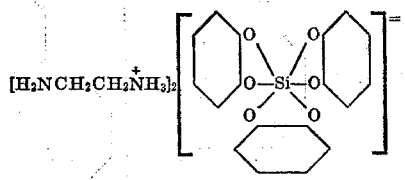

and 4 to 8 parts by weight of

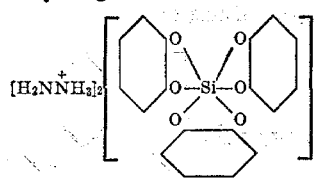

16. The process of claim 14 wherein in the composition the filler is silica, and there is a complex selected from the group consisting of 6 to 10 parts by weight of

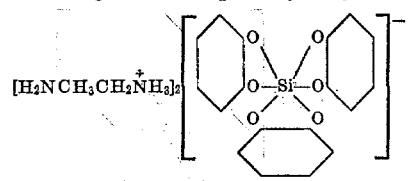

and 4 to 8 parts by weight of

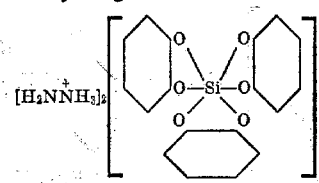

17. The process of claim 12 wherein the complex has the general formula

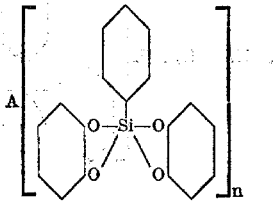

18. The process of claim 17 wherein the filler in the composition is a talc or silica filler, and a flow control agent and a pigment are also included in the composition.

19. The process of claim 18 wherein in the composition the filler is talc, and there is 8 to 12 parts by weight of a complex selected from the group consisting of

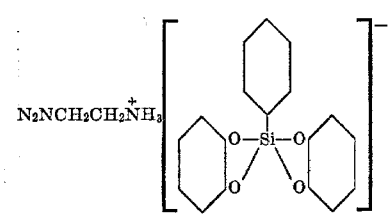

and

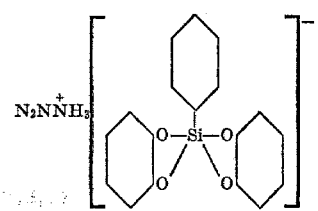

20. The process of claim 18 wherein in the composition the filler is talc, and there is 8 to 12 parts by weight of a complex selected from the group consisting of

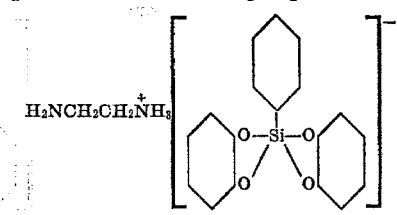

and

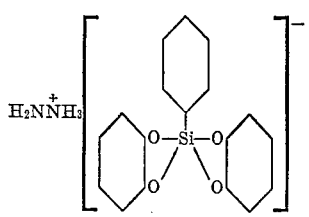

21. A process for coating a metal which comprises heating the metal to a temperature such that the coating powder will fuse and flow out into a smooth coating when the metal is brought into contact with the powdered coating composition, applying to the heated metal a powdered coating composition comprising about 100 parts by weight of a solid epoxy resin having more than one vicinal epoxy group per molecule, about 5 to 120 parts by weight of a filler, a cyclic anhydride of a polycarboxylic organic acid, and a complex selected from the group consisting of complexes having the general formulae

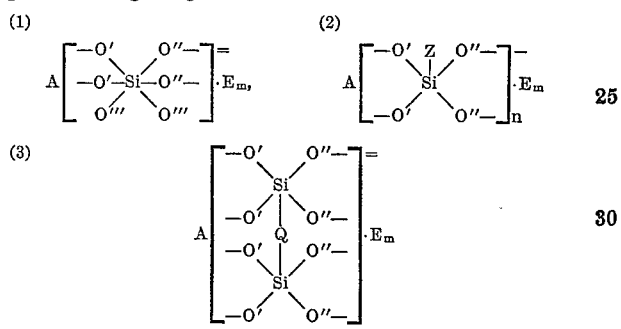

and mixtures thereof, wherein the O' oxygen atoms are attached to carbon atoms of an aromatic ring which are ortho to each other, the O'' oxygen atoms are attached to carbon atoms of an aromatic ring which are ortho to each other, the O''' oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer, and the ratio of anions to cations in (1) and (3) is such that there is an equal number of positive and negative charges in the complex, whereby the metal becomes coated with the composition, and thereafter cooling the coated metal.

22. The process of claim 21 wherein the anhydride is selected from the group consisting of trimellitic anhydride, pyromellitic dianhydride, phthalic anhydride, hexahydrophthalic anhydride, methyl nadic anhydride, dodecenylsuccinic anhydride and chlorendic anhydride.

23. The process of claim 22 wherein the complex has the general formula

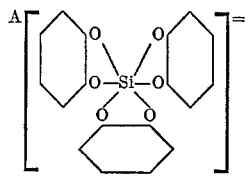

24. The process of claim 23 wherein the complex is selected from the group consisting of

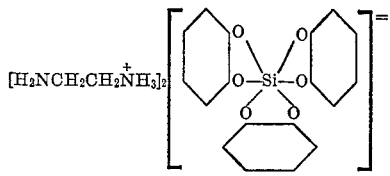

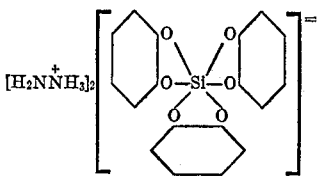

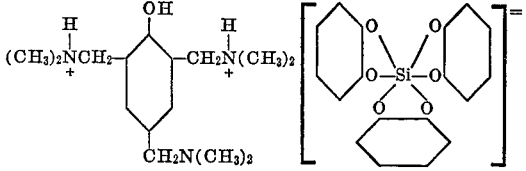

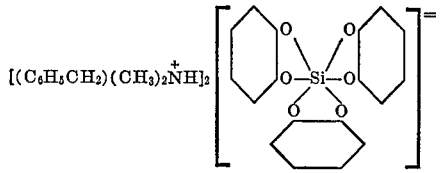

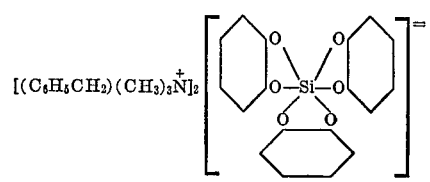

and

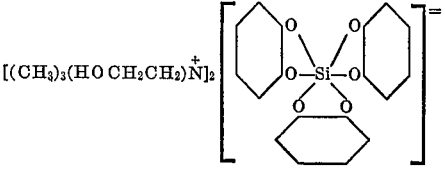

25. The process of claim 24 wherein the filler in the composition is a talc or silica filler, and a flow control agent and a pigment are also included in the composition.

26. The process of claim 22 wherein the complex has the general formula

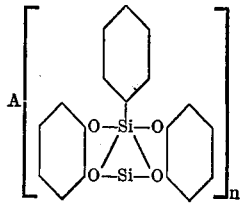

27. The process of claim 26 wherein the complex is selected from the group consisting of

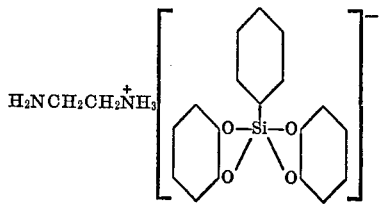

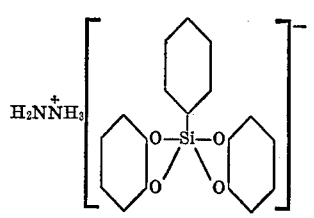

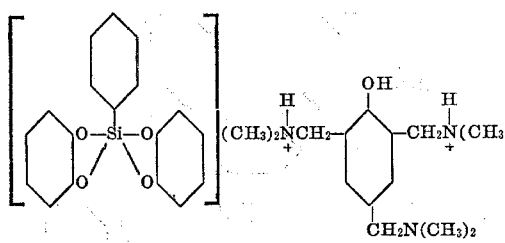

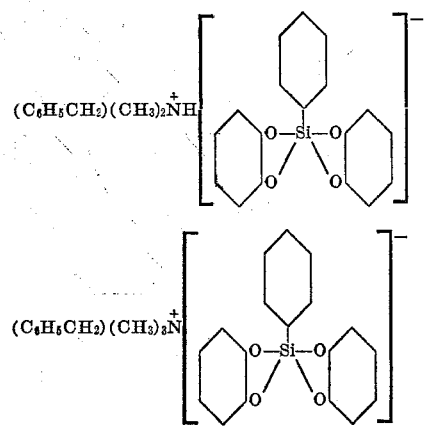

and

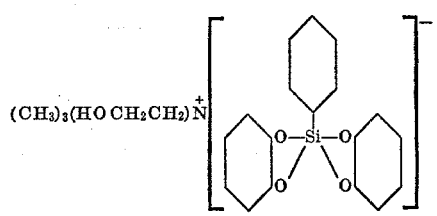

28. The process of claim 27 wherein the filler in the composition is a talc or silica filler, and a flow control agent and a pigment are also included in the composition.

29. A process for coating a metal which comprises heating the metal to a temperature such that the coating powder will fuse and flow out into a smooth coating when the metal is brought into contact with the powdered coating composition, applying to the heated metal a powdered coating composition comprising about 100 parts by weight of a solid epoxy resin having more than one vicinal epoxy group per molecule, about 5 to 120 parts by weight of a filler, and a complex selected from the group consisting of complexes having the general formulae (1) 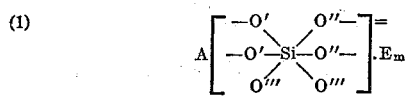

(2) 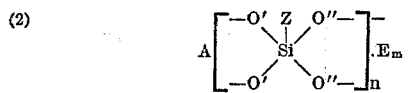

(3) 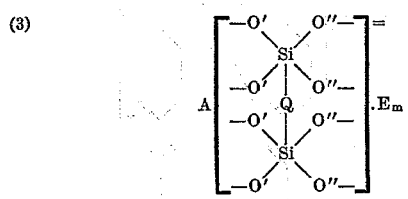

and mixtures thereof, wherein the O′ oxygen atoms are attached to carbon atoms of an aromatic ring which are ortho to each other, the O″ oxygen atoms are attached to carbon atoms of an aromatic ring which are ortho to each other, the O‴ oxygen atoms are attached to carbon atoms of an aromatic ring which are ortho to each other, Z is a monovalent radical attached to the silicon atom via a silicon-carbon bond, Q is a divalent radical attached to each silicon atom via a silicon-carbon bond, A is a cation formed from an amine, $n$ is an integer not greater than the valence of A, E is unprotonated amine, $m$ is from zero to an integer, and the ratio of anions to cations in (1) and (3) is such that there is an equal number of positive and negative charges in the complex, whereby the metal becomes coated with the composition, and thereafter cooling the coated metal.

30. The process of claim 29 wherein the complex has the general formula

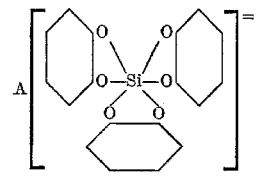

31. The process of claim 30 wherein the filler in the composition is a talc or silica filler, and a flow control agent and a pigment are also included in the composition.

32. The process of claim 29 wherein the complex has the general formula

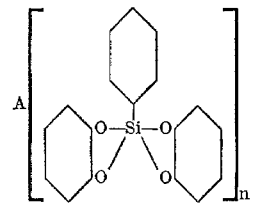

33. The process of claim 32 wherein the filler in the composition is a talc or silica filler, and a flow control agent and a pigment are also included in the composition.

34. Coated pipe produced by the process of claim 1.
35. Coated pipe produced by the process of claim 3.
36. Coated pipe produced by the process of claim 4.
37. Coated pipe produced by the process of claim 7.
38. Coated pipe produced by the process of claim 8.
39. Coated pipe produced by the process of claim 12.
40. Coated pipe produced by the process of claim 13.
41. Coated pipe produced by the process of claim 17.
42. A coated metal produced by the process of claim 21.
43. A coated metal produced by the process of claim 29.

References Cited

UNITED STATES PATENTS

| 3,133,108 | 6/1964 | Finestone | 260—448.8 |
| 3,161,530 | 12/1964 | Strobel | 117—18 |
| 3,208,868 | 9/1965 | Strobel et al. | 117—18 |
| 3,190,845 | 6/1965 | Goodnight | 117—18 |

MURRAY KATZ, Primary Examiner

P. ATTAGUILE, Assistant Examiner

U.S. Cl. X.R.

117—21, 128.4, 161; 260—37, 2, 47, 448.8